United States Patent
Hurtta (10) Patent No.: US 7,944,914 B2
(45) Date of Patent: *May 17, 2011

(54) DEFAULT SUBSCRIPTION PROFILE FOR A ROAMING TERMINAL DEVICE IN A PACKET DATA BASED MOBILE COMMUNICATION NETWORK

(75) Inventor: Tuija Hurtta, Espoo (FI)

(73) Assignee: Nokia Corporation, Espoo (FI)

( * ) Notice: Subject to any disclaimer, the term of this patent is extended or adjusted under 35 U.S.C. 154(b) by 1006 days.

This patent is subject to a terminal disclaimer.

(21) Appl. No.: 11/068,379

(22) Filed: Mar. 1, 2005

(65) Prior Publication Data

US 2006/0133317 A1    Jun. 22, 2006

(30) Foreign Application Priority Data

Dec. 22, 2004    (FI) ..................... 20041652

(51) Int. Cl.
  *H04W 4/00*    (2009.01)
(52) U.S. Cl. ..... 370/388; 370/401; 455/403; 455/432.1; 455/461
(58) Field of Classification Search ........... 370/401, 370/402, 403, 404, 405, 400, 420
See application file for complete search history.

(56) References Cited

U.S. PATENT DOCUMENTS

| | | |
|---|---|---|
| 6,781,972 B1 | 8/2004 | Anderlind et al. |
| 7,231,028 B2 | 6/2007 | Jarvi ........................ 379/201.01 |
| 2001/0053200 A1* | 12/2001 | Jarvi |
| 2002/0164983 A1* | 11/2002 | Raviv et al. .................... 455/432 |
| 2003/0035409 A1* | 2/2003 | Wang et al. .................... 370/349 |
| 2003/0179762 A1* | 9/2003 | Isomaki et al. ............... 370/401 |
| 2004/0242229 A1 | 12/2004 | Okazaki |
| 2005/0135375 A1* | 6/2005 | Hurtta et al. ............... 370/395.2 |
| 2005/0239458 A1* | 10/2005 | Hurtta ........................ 455/432.1 |

FOREIGN PATENT DOCUMENTS

EP    1 139 681    10/2001

OTHER PUBLICATIONS

Notification of the Second Office Action dated Jan. 8, 2010, issued by the State Intellectual Property of China in connection with corresponding Chines patent application No. 2005800416961.

* cited by examiner

*Primary Examiner* — Seema S Rao
*Assistant Examiner* — Henry Baron
(74) *Attorney, Agent, or Firm* — Mintz, Levin, Cohn, Ferris, Glovsky, and Popeo, P.C.

(57) ABSTRACT

The invention concerns providing a default subscription profile for controlling a roaming terminal device in a packet data based mobile communication network. A roaming terminal device requesting to use a gateway is detected. A request for a subscription profile for the roaming terminal device is sent from the gateway. A default subscription profile stored in a network element of the mobile communication network is sent to the gateway. The invention allows avoiding the need to transmit the subscription profile of the roaming terminal device from a home network of the roaming terminal device to the visited network. Thus real-time signaling and its associated delay are decreased. Furthermore, the subscription profile is accessible even when there are connection problems between the home network and the visited network.

23 Claims, 3 Drawing Sheets

DEFAULT SUBSCRIPTION PROFILE FOR A ROAMING TERMINAL DEVICE IN A PACKET DATA BASED MOBILE COMMUNICATION NETWORK

BACKGROUND OF THE INVENTION

1. Field of the Invention

The invention relates to communication networks. In particular, the invention relates to providing a default subscription profile for controlling a roaming terminal device in a packet data based mobile communication network in a novel way.

2. Description of the Related Art

Recently also mobile communication networks have started to support transmission of packet switched data or packet data in addition to traditional circuit switched data transmission.

An example of a technique allowing packet data transmission for mobile communication networks is General Packet Radio Service (GPRS). GPRS is designed to support e.g. digital mobile telecommunication networks based on the Global System for Mobile Communications (GSM) standard. However, GPRS is not restricted to only GSM networks but may support for example $3^{rd}$ Generation Partnership Project (3GPP) based digital mobile telecommunication networks. Other examples of packet data based mobile communication networks are Wireless Local Area Network (WLAN) based mobile communication networks, Code Division Multiple Access (CDMA) based mobile communication networks, Wideband Code Division Multiple Access (WCDMA) based mobile communication networks, and Enhanced Data Rates for Global Evolution (EDGE) based mobile communication networks.

A GPRS based mobile communication network comprises supplementary network elements or nodes in addition to existing network elements. These include a Serving GPRS Support Node (SGSN) and a Gateway GPRS Support Node (GGSN). A Serving GPRS Support Node typically delivers packets to and from GPRS enabled terminal devices within its service area. A Gateway GPRS Support Node is typically used as an interface to external IP networks such as the Internet, other mobile service providers' GPRS services, or enterprise intranets.

The introduction of packet data based mobile communication networks has resulted in various value-added subscriber services being provided for these packet data based mobile communication networks. Examples of such subscriber services are packet data based voice, email, content downloading, browsing, streaming and rich calls. Furthermore, packet data based mobile communication networks typically offer network services to support the usage of subscriber services. Such network services include e.g. rerouting, barring, accounting, content proxy services, content blocking services, firewall services, virus scanning services, performance enhancement proxy services, Virtual Private Network (VPN) services, various Quality of Service (QoS) related services and various charging related services for both online and offline charging.

A recent trend is to provide the various subscriber and network services for packet data based mobile communication networks in a subscriber specific manner. To allow this, one or more subscription profiles are generated for each subscriber. The subscription profile comprises subscriber specifically customized subscription data that will be utilized in providing the various subscriber and network services to the terminal device of the subscriber. The subscription data may comprise e.g. authorization information about which access points in the mobile communication network the subscriber is allowed to access, and which services are allowed within each allowed access point. The subscription data may further comprise e.g. information about charging attributes or rules, Quality of Service attributes or rules, and service chaining attributes such as attributes or rules for chained service selection and chained service component specific attributes or rules. An access point may be e.g. a Gateway GPRS Support Node of a General Packet Radio Service based mobile communication network, or a Packet Data Gateway of a Wireless Local Area Network based mobile communication network.

Prior art teaches storing the generated subscription profile in a subscriber database of a home network of the subscriber. As is known in the art, in the context of mobile communication networks, when a subscriber connects via a service area that is managed by an operator other than the one with whom the subscriber originally registered with, the subscriber is said to be 'roaming'. In contrast, when the subscriber connects via a service area that is managed by the operator with whom the subscriber originally registered with, the subscriber is said to be at 'home'. The mobile communication network managed by the operator with whom the subscriber originally registered with is called the home network of the subscriber. The subscriber database may be, for example, a Home Location Register in a General Packet Radio Service based mobile communication network.

The prior art solution of storing the generated subscription profile in the subscriber database of the home network of the subscriber works reasonably well while the subscriber is at home.

However, problems arise when the subscriber is roaming. When the terminal device of the subscriber roams into a visited network and requests to use a gateway of the visited network, the gateway needs to acquire the subscription profile of the roaming terminal device. Prior art teaches ways of acquiring the subscription profile. A way involves the gateway of the visited network directly contacting the subscriber database of the home network of the roaming terminal device and requesting the subscription profile of the roaming terminal device. Another way involves the gateway of the visited network first contacting a session control means of the home network of the roaming terminal device and requesting the subscription profile of the roaming terminal device. The session control means in turn contacts the subscriber database of the home network of the roaming terminal device, requests the subscription profile of the roaming terminal device, and forwards relevant parts of the subscription profile to the gateway of the visited network. Yet another way involves the gateway of the visited network contacting the session control means of the visited network, and the session control means of the visited network contacting the subscriber database of the home network and requesting the subscription profile of the roaming terminal device. The session control means is sometimes also referred to as Internet Protocol Session Control, a Policy Decision Function (PDF), a Charging Rules Function (CRF) or a Policy and Charging Control Node (PCCN)

Thus, in prior art, when the terminal device is roaming and its subscription profile is required, the subscription profile will always have to be transmitted from one network to another, i.e. from the home network to the visited network. This, however, is not desirable. Transmitting the subscription profile from one network to another requires real-time signaling which in turn causes delay. In today's highly loaded mobile communication networks real-time signaling and its associated delay is to be avoided whenever possible. Furthermore, transmitting the subscription profile from one network to another may not even be possible at all times due to e.g. some connection problem between the two networks.

Prior art further includes U.S. Ser. No. 09/774998, now U.S. Pat. No. 7,231,028, which discloses a method and system for the management of subscriber functions in a digital telephone exchange. The functions for default subscribers are stored in and read from default records common to the subscribers, and only the functions for special subscribers are stored in and read from subscriber-specific records.

Therefore, the object of the present invention is to alleviate the problems described above and to introduce a mechanism that allows providing a default subscription profile for controlling a roaming terminal device in a packet data based mobile communication network in order to avoid having to transmit the subscription profile of the roaming terminal device from the home network of the roaming terminal device to the visited network.

SUMMARY OF THE INVENTION

A first aspect of the present invention is a method of providing a default subscription profile for a roaming terminal device in a packet data based mobile communication network.

A terminal device roaming in a packet data based mobile network requesting to use a gateway of the mobile communication network is detected. As the terminal device is roaming in the mobile communication network, this mobile communication network is not a home network of the terminal device.

In response to the detection, a request for a subscription profile for the roaming terminal device is sent from the gateway.

In response to the received request, a default subscription profile stored in a network element of the mobile communication network is sent to the gateway. The default subscription profile comprises default subscription data to be utilized in providing services to the roaming terminal device.

The term 'service' herein refers to both the value-added subscriber services and the network services supporting them, as described above.

The term 'default' herein refers to the fact that the default subscription data comprised in the default subscription profile is not subscriber specifically customized subscription data, as is the case with the prior art subscription profile stored in the home network of the roaming terminal device. Rather, the default subscription profile is stored in the visited network instead of the home network, and one default subscription profile may be used for multiple subscribers roaming in the visited network or even all the subscribers roaming in the visited network.

A second aspect of the present invention is a method of generating a subscription profile for a roaming terminal device in a packet data based mobile communication network.

At least one default subscription profile comprising default subscription data is generated. The generated at least one default subscription profile is stored in a network element of a packet data based mobile communication network. The default subscription data is to be utilized in providing services to a terminal device roaming in the mobile communication network.

A third aspect of the present invention is a system of providing a default subscription profile for a roaming terminal device in a packet data based mobile communication network. The system comprises a packet data based mobile communication network.

The system further comprises a default subscription profile generator, in the mobile communication network, for generating at least one default subscription profile comprising default subscription data to be utilized in providing services to a terminal device roaming in the mobile communication network.

The system further comprises a default subscription profile storage, in the mobile communication network, for storing the at least one generated default subscription profile. The system further comprises a gateway, in the mobile communication network, for requesting the stored default subscription profile in response to detecting a terminal device roaming in the mobile communication network requesting to use the gateway.

A fourth aspect of the present invention is a system of providing a default subscription profile for a roaming terminal device in a packet data based mobile communication network. The system comprises a packet data based mobile communication network.

The system further comprises a default subscription profile generating means, in the mobile communication network, for generating at least one default subscription profile comprising default subscription data to be utilized in providing services to a terminal device roaming in the mobile communication network.

The system further comprises a default subscription profile storing means, in the mobile communication network, for storing the at least one generated default subscription profile. The system further comprises a gateway means, in the mobile communication network, for requesting the stored default subscription profile in response to detecting a terminal device roaming in the mobile communication network requesting to use the gateway means.

A fifth aspect of the present invention is a network element of a packet data based mobile communication network. The network element comprises a default subscription profile generator for generating at least one default subscription profile comprising default subscription data to be utilized in providing services to a terminal device roaming in the mobile communication network.

A sixth aspect of the present invention is a network element of a packet data based mobile communication network. The network element comprises a default subscription profile storage for storing at least one default subscription profile comprising default subscription data to be utilized in providing services to a terminal device roaming in the mobile communication network.

A seventh aspect of the present invention is a network element of a packet data based mobile communication network. The network element comprises a selector for selecting a default subscription profile out of multiple default subscription profiles for a terminal device roaming in the mobile communication network according to a predetermined selection criterion. The multiple default subscription profiles are stored in a network element of the mobile communication network. Each profile comprises at least partially different default subscription data to be utilized in providing services to the roaming terminal device.

An eight aspect of the present invention is a computer program embodied on a computer readable medium for providing a default subscription profile for a roaming terminal device in a packet data based mobile communication network. The computer program controls a data-processing device to perform the steps of: detecting a terminal device roaming in a packet data based mobile communication network requesting to use a gateway of the mobile communication network; sending, from the gateway, a request for a subscription profile for the roaming terminal device; and sending, to the gateway, a default subscription profile stored in a network element of the mobile communication network, the default subscription profile comprising default subscription data to be utilized in providing services to the roaming terminal device.

A ninth aspect of the present invention is a computer program embodied on a computer readable medium for generating a default subscription profile for a roaming terminal device in a packet data based mobile communication network. The computer program controls a data-processing device to perform the steps of: generating at least one default subscription profile comprising default subscription data; and storing the generated at least one default subscription profile in a network element of a packet data based mobile communication network, the default subscription data to be utilized in providing services to a terminal device roaming in the mobile communication network.

In an embodiment of the invention, multiple default subscription profiles are generated and stored in a network element of the mobile communication network. Each profile comprises at least partially different default subscription data. One default subscription profile out of the multiple stored profiles is selected for a given roaming terminal device according to a predetermined selection criterion.

In an embodiment of the invention, the default subscription profile out of the multiple stored profiles is selected according to a predetermined selection criterion comprising at least one of: access network type, time of day, network load, and a group of the roaming terminal device.

In an embodiment of the invention, the default subscription data comprises at least one of: allowed access points in the mobile communication network, allowed services within each allowed access point, charging attributes, Quality of Service attributes, and service chaining attributes.

In an embodiment of the invention, the default subscription profile generator is comprised in at least one of: the gateway, a session control means of the mobile communication network, and a subscriber database of the mobile communication network.

In an embodiment of the invention, the default subscription profile storage is comprised in at least one of: the gateway, a session control means of the mobile communication network, and a subscriber database of the mobile communication network.

The invention allows avoiding the need to transmit the subscription profile of the roaming terminal device from the home network of the roaming terminal device to the visited network. Rather, a default subscription profile stored in the visited network is used. Thus real-time signaling and its associated delay are decreased. Furthermore, the subscription profile is accessible even when there are connection problems between the home network and the visited network.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE PREFERRED EMBODIMENTS

Reference will now be made in detail to the embodiments of the invention, examples of which are illustrated in the accompanying drawings.

Figure 1A:
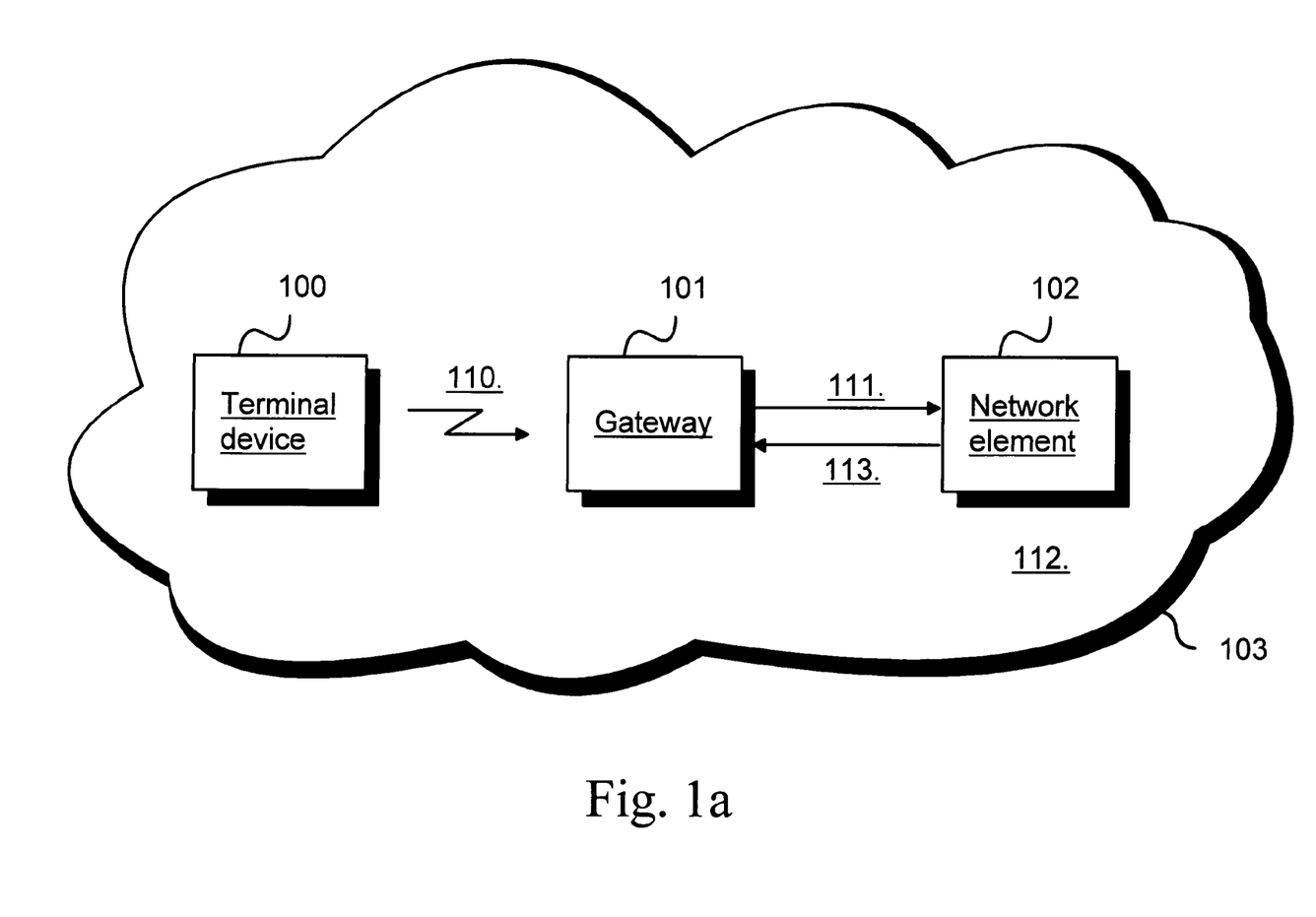
FIG. 1a is a graphical representation illustrating a method according to an embodiment of the present invention.

FIG. 1a illustrates an exemplary embodiment of the method of the present invention relating to providing a default subscription profile for a roaming terminal device in a packet data based mobile communication network. In the exemplary embodiment of FIG. 1a the packet data based mobile communication network 103 comprises a General Packet Radio Service based mobile communication network the packet data transmission of which is based on Internet Protocol (IP). However, the present invention applies as well to e.g. Wireless Local Area Network based mobile communication networks, Code Division Multiple Access based mobile communication networks, Wideband Code Division Multiple Access based mobile communication networks, and Enhanced Data Rates for Global Evolution based mobile communication networks.

At step 110, a terminal device 100 roaming in the packet data based mobile network 103 sends a request to use a gateway 101 of the packet data based mobile communication network 103, and the gateway 101 detects the request. The request may be a request for bearer establishment or modification, such as a request for e.g. Packet Data Protocol context activation or modification or a request for tunnel establishment or modification, or the request may be a packet of a service flow.

In response to the detection, at step 111, the gateway 101 sends a request for a subscription profile for the roaming terminal device. The subscription profile request is sent to a network element 102 of the packet data based mobile communication network 103.

In the exemplary embodiment of FIG. 1a, the network element 102 comprises multiple default subscription profiles stored therein. Each stored default subscription profile comprises default subscription data. The default subscription data is to be utilized by the gateway 101 in providing services to the roaming terminal device 100, and the default subscription data may comprise e.g. allowed access points in the packet data based mobile communication network 103, allowed services within each allowed access point, charging attributes, Quality of Service attributes, and/or service chaining attributes. In other words, the default subscription data may comprise at least partially same subscription attributes as the prior art subscription profile customized specifically for the subscriber of the terminal device 100 and located typically in a subscriber database of a home network of the terminal device 100. However, the values of the subscription attributes of the default subscription data are default values as opposed to the subscriber specifically customized values of the prior art subscription attributes of the prior art subscription profile. Thus, if e.g. the set of allowed services is limited in the visited network compared to the home network, the default subscription profile of the present invention allows indicating which access points and services are allowed in the visited network. Likewise, the present invention allows setting such rules for charging, Quality of Service, and service chaining purposes, that are specific to the visited network but still common to all the roaming terminal devices in the visited network or to a group of all the roaming terminal devices in the visited network.

If there are multiple stored default subscription profiles, as is the case with the exemplary embodiment of FIG. 1a, each stored default subscription profile comprises default subscription data that is at least partially different from each other.

At step 112, one default subscription profile out of the stored multiple default subscription profiles is selected at the network element 102 for the roaming terminal device 100 according to a predetermined selection criterion. The selection criterion may be e.g. access network type, time of day, network load, or a group of the roaming terminal device 100.

Thus, the present invention allows using a given default subscription profile for all roaming subscribers or for a group of roaming subscribers. Correspondingly, a first default subscription profile may be used for a first group of subscribers, and a second default subscription profile may be used for a second group of subscribers. A first group of subscribers may be e.g. the roaming subscribers of a first network operator, whereas a second group of subscribers may be e.g. the roaming subscribers of a second network operator. To allow this, subscriber identification of the roaming terminal device, such as e.g. International Mobile Subscriber Identifier (IMSI), may be analyzed in order to determine to which group a given roaming terminal device belongs.

Furthermore, the present invention allows e.g. using a first default subscription profile for a first access network type of the roaming terminal device, such as e.g. General Packet Radio Service, and a second default subscription profile for a second access network type of the roaming terminal device, such as e.g. Wireless Local Area Network.

Furthermore, the present invention allows e.g. using a first default subscription profile comprising a more limited set of allowed services during busy hours of the visited network, and a second default subscription profile comprising a less limited set of allowed services during non-busy hours. Furthermore, the present invention allows e.g. using a first default subscription profile comprising more limited rules for Quality of Service during high network load of the visited network, and a second default subscription profile comprising less limited rules for Quality of Service during low network load.

In response to the received subscription profile request, at step 113, the selected default subscription profile is sent from the network element 102 to the gateway 101.

Figure 1B:
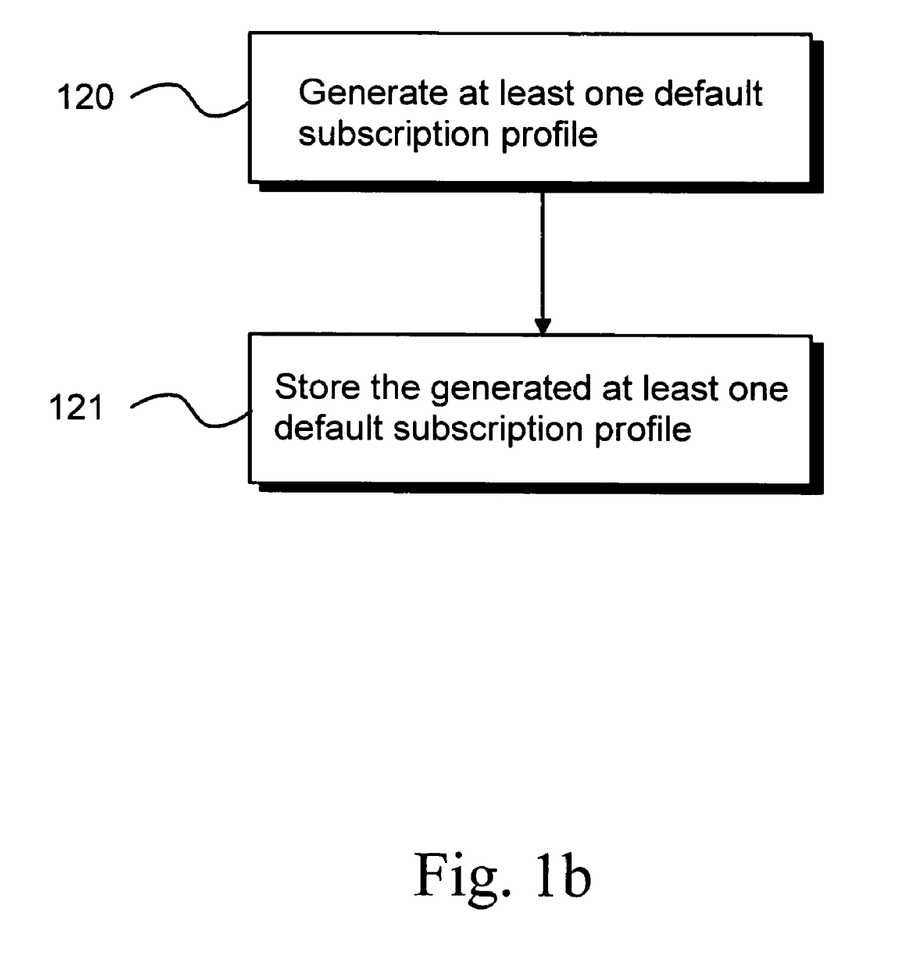
FIG. 1b is a flow diagram illustrating another method according to an embodiment of the present invention.

FIG. 1b illustrates an exemplary embodiment of the method of the present invention relating to generating a subscription profile for a roaming terminal device in a packet data based mobile communication network. At step 120, at least one default subscription profile comprising default subscription data is generated. At step 130, the generated at least one default subscription profile is stored in a network element of a packet data based mobile communication network. The default subscription data is to be utilized in providing services to a terminal device roaming in the same packet data based mobile communication network in which the generated at least one default subscription profile is stored.

Figure 2:
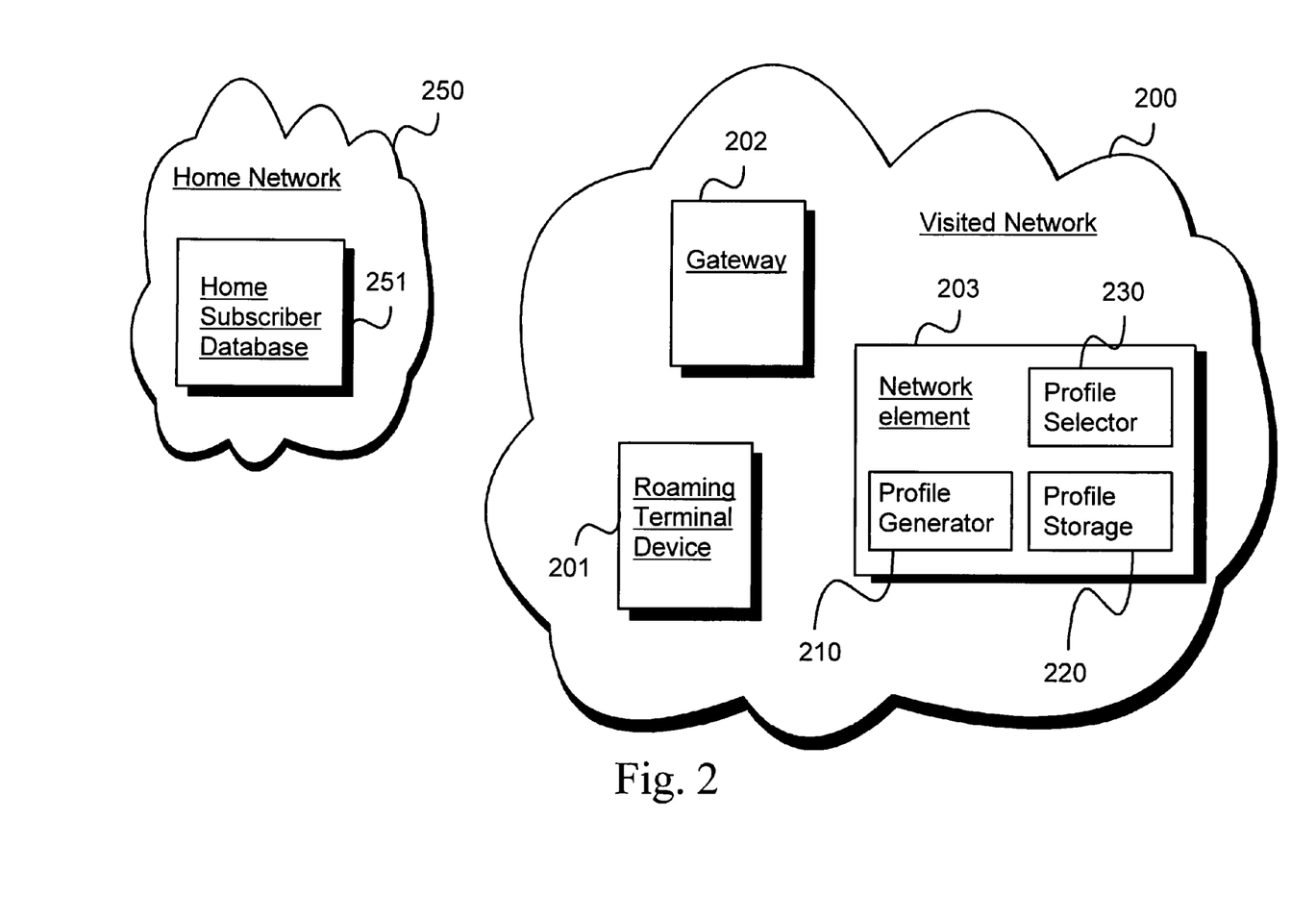
FIG. 2 is a block diagram illustrating a system according to an embodiment of the present invention.

FIG. 2 illustrates an exemplary embodiment of the system of the present invention relating to providing a default subscription profile for a roaming terminal device in a packet data based mobile communication network. The system comprises a packet data based mobile communication network 200. In the exemplary embodiment of FIG. 2 the packet data based mobile communication network 200 comprises a General Packet Radio Service based mobile communication network. However, the present invention applies as well to e.g. Wireless Local Area Network based mobile communication networks, Code Division Multiple Access based mobile communication networks, Wideband Code Division Multiple Access based mobile communication networks, and Enhanced Data Rates for Global Evolution based mobile communication networks.

FIG. 2 also illustrates a terminal device 201 which is roaming in the packet data based mobile communication network 200. Thus the packet data based mobile communication network 200 is a visited network from the point of view of the terminal device 201. For the sake of clarity, FIG. 2 also illustrates a home network 250 of the terminal device 201 which may be another packet data based mobile communication network, and a home subscriber database 251 located in the home network 250. The home subscriber database 251 may comprise a prior art subscription profile specifically customized for the subscriber of the terminal device 201. FIG. 2 further illustrates a network element 203 comprised in the packet data based mobile communication network 200.

The system further comprises a default subscription profile generator 210, in the mobile communication network 200, for generating at least one default subscription profile comprising default subscription data to be utilized in providing services to the terminal device 201 roaming in the mobile communication network 200. In the exemplary embodiment of FIG. 2, the default subscription profile generator 210 is configured to generate multiple default subscription profiles, each profile comprising at least partially different default subscription data.

The system further comprises a default subscription profile storage 220, in the mobile communication network 200, for storing the generated default subscription profiles. The system further comprises a gateway 202, in the mobile communication network 200, for requesting one of the stored default subscription profiles in response to detecting the terminal device 201 roaming in the mobile communication network 200 and requesting to use the gateway 202. In the exemplary embodiment of FIG. 2, the gateway 202 is a Gateway GPRS Support Node. However, if the mobile communication network 200 comprises a Wireless Local Area Network based mobile communication network, the gateway 202 may be e.g. a Packet Data Gateway.

The system further comprises a selector 230, in the mobile communication network 200, for selecting one default subscription profile out of the stored multiple profiles for the roaming terminal device 201 according to a predetermined selection criterion. The selection criterion may be e.g. access network type, time of day, network load, or a group to which the roaming terminal device 201 belongs.

The default subscription profile generator 210, the default subscription profile storage 220, and the selector 230 may, as illustrated in FIG. 2, be implemented in the network element 203 which is a new dedicated network element of the mobile communication network 200. However, the default subscription profile generator 210, the default subscription profile storage 220, and the selector 230 may alternatively be implemented in one or more already existing network elements of the mobile communication network 200, such as the gateway 202, a session control means (not illustrated in FIG. 2) of the mobile communication network 200, or a subscriber database (not illustrated in FIG. 2) of the mobile communication network 200. Naturally, the default subscription profile generator 210, the default subscription profile storage 220, and the selector 230 may also be distributed between various network elements of the mobile communication network 200. Furthermore, the default subscription profile generator 210, the default subscription profile storage 220, and the selector 230 may be implemented by software, hardware or a combination thereof.

The present invention illustrated in FIG. 2 allows acquiring the subscription profile needed in order to provide services for the roaming terminal device 201 from inside the visited network 200 rather than from the home subscriber database 251 in the home network 250, as is the case with prior art. Thus real-time signaling between the mobile communication networks 200 and 250 is decreased. Thus delay associated with the real-time signaling is decreased.

It is obvious to a person skilled in the art that with the advancement of technology, the basic idea of the invention may be implemented in various ways. The invention and its embodiments are thus not limited to the examples described above, instead they may vary within the scope of the claims.

What is claimed is:

1. A method comprising:
   receiving, from a gateway of a visited packet data based mobile communication network, a request for a subscription profile for a terminal device detected roaming in said visited packet data based mobile communication network and requesting to use said gateway; and
   sending, to said gateway, a default subscription profile generated and stored in a network element of said visited packet data based mobile communication network rather than accessed from a home packet data based mobile communication network, said default subscription profile comprising default subscription data to be utilized in providing services to said terminal device roaming in said visited packet data based mobile communication network, and said default subscription profile available for use by multiple subscribers roaming in said visited packet data based mobile communication network.

2. The method according to claim 1, wherein said network element of said visited packet data based mobile communication network comprises multiple default subscription profiles stored therein, each profile comprising at least partially different default subscription data, and wherein the method further comprises
   selecting the default subscription profile out of said multiple default subscription profiles for said roaming terminal device according to a predetermined selection criterion, wherein the selection is performed at the network element rather than at a subscriber database of the home packet data based mobile communication network.

3. The method according to claim 2, wherein said selecting further comprises selecting said default subscription profile according to a predetermined selection criterion comprising at least one of access network type, time of day, network load, and a group of said roaming terminal device.

4. A method comprising:
   generating at least one default subscription profile comprising default subscription data; and
   storing said generated at least one default subscription profile in a network element of a visited packet data based mobile communication network, said default subscription data to be utilized in providing services to a terminal device roaming in said visited packet data based mobile communication network, and said at least one default subscription profile available for use by multiple subscribers roaming in said visited packet data based mobile communication network, and said at least one default subscription profile available for use by multiple subscribers roaming in the visited packet data based mobile communication network.

5. The method according to claim 4, wherein said generating further comprises generating multiple default subscription profiles, each profile comprising at least partially different default subscription data, a default subscription profile out of said multiple default subscription profiles to be selected for a given roaming terminal device according to a predetermined selection criterion.

6. The method according to claim 4, wherein said generating further comprises generating default subscription data comprising at least one of allowed access points, allowed services within each allowed access point, charging attributes, quality of service attributes, and service chaining attributes.

7. A system comprising:
   a visited packet data based mobile communication network;
   a default subscription profile generator, included in said visited packet data based mobile communication network, configured to generate at least one default subscription profile comprising default subscription data to be utilized in providing services to a terminal device roaming in said visited packet data based mobile communication network;
   a default subscription profile storage, included in said visited packet data based mobile communication network, configured to store said at least one generated default subscription profile; and
   a gateway, included in said visited packet data based mobile communication network, configured to request said stored default subscription profile in response to detecting a terminal device roaming in said visited packet data based mobile communication network requesting to use said gateway,
   wherein said at least one default subscription profile is available for use by multiple subscribers roaming in said visited packet data based mobile communication network.

8. The system according to claim 7, wherein said default subscription profile generator is further configured to generate multiple default subscription profiles, each profile comprising at least partially different default subscription data, and wherein the system further comprises
   a selector, included in said mobile communication network, configured to select a default subscription profile out of said multiple default subscription profiles for said roaming terminal device according to a predetermined selection criterion.

9. The system according to claim 7, wherein said default subscription profile generator is included in at least one of said gateway, a session controller of said visited packet data based mobile communication network, and a subscriber database of said visited packet data based mobile communication network.

10. An apparatus comprising:
    a selector configured to select a default subscription profile out of multiple default subscription profiles for a terminal device roaming in a visited packet data based mobile communication network according to a predetermined selection criterion, said multiple default subscription profiles generated and stored in a network element of said visited packet data based mobile communication network in which said terminal device is roaming, and each profile comprising at least partially different default subscription data to be utilized in providing services to said roaming terminal device, wherein said default subscription profile is available for use by multiple subscribers roaming in said visited packet data based mobile communication network.

11. A computer program, embodied on a non-transitory computer readable medium, the computer program controlling a data-processing device to provide operations comprising:
receiving, from a gateway of a visited packet data based mobile communication network, a request for a subscription profile for a terminal device detected roaming in said visited packet data based mobile communication network and requesting to use said gateway; and
sending, to said gateway, a default subscription profile generated and stored in a network element of said visited packet data based mobile communication network in which said terminal device is roaming, said default subscription profile comprising default subscription data to be utilized in providing services to said roaming terminal device, and said default subscription profile available for use by multiple subscribers roaming in said visited packet data based mobile communication network.

12. A computer program, embodied on a non-transitory computer readable medium, the computer program controlling a data-processing device to provide operations comprising:
generating at least one default subscription profile comprising default subscription data, and
storing said generated at least one default subscription profile in a network element of a visited packet data based mobile communication network, said default subscription data to be utilized in providing services to a terminal device roaming in said visited packet data based mobile communication network, and said at least one default subscription profile available for use by multiple subscribers roaming in said visited packet data based mobile communication network, and said at least one default subscription profile available for use by multiple subscribers roaming in said visited packet data based mobile communication network.

13. An apparatus comprising:
a receiver configured to receive, from a gateway of a visited packet data based mobile communication network, a request for a subscription profile for a terminal device detected roaming in said visited packet data based mobile communication network and requesting to use said gateway; and
a transmitter configured to send, to said gateway, a default subscription profile generated and stored in a network element of said visited packet data based mobile communication network in which said terminal device is roaming, said default subscription profile comprising default subscription data to be utilized in providing services to said roaming terminal device, and said default subscription profile available for use by multiple subscribers roaming in said visited packet data based mobile communication network.

14. The apparatus according to claim 13, wherein said network element of said visited packet data based mobile communication network comprises multiple default subscription profiles stored therein, each profile comprising at least partially different default subscription data, and wherein the apparatus further comprises
a selector configured to select the default subscription profile out of said multiple default subscription profiles for said roaming terminal device according to a predetermined selection criterion.

15. The apparatus according to claim 14, wherein said selector is further configured to select said default subscription profile according to a predetermined selection criterion comprising at least one of access network type, time of day, network load, and a group of said roaming terminal device.

16. The apparatus according to claim 10, further comprising:
a default subscription profile generator configured to generate the multiple default subscription profiles; and
a default subscription profile storage configured to store the multiple default subscription profiles.

17. The apparatus according to claim 16, wherein said default subscription profile generator is further configured to generate multiple default subscription profiles, each profile comprising at least partially different default subscription data, a default subscription profile out of said multiple default subscription profiles to be selected for a given roaming terminal device according to a predetermined selection criterion.

18. The apparatus according to claim 16, wherein said default subscription profile generator is further configured to generate default subscription data comprising at least one of allowed access points, allowed services within each allowed access point, charging attributes, quality of service attributes, and service chaining attributes.

19. An apparatus comprising:
storing means for storing multiple default subscription profiles in a network element of a visited packet data based mobile communication network; and
selecting means for selecting a default subscription profile out of said multiple default subscription profiles for a terminal device roaming in said visited packet data based mobile communication network according to a predetermined selection criterion,
wherein each of said default subscription profiles comprise at least partially different default subscription data to be utilized in providing services to said roaming terminal device, and
wherein said default subscription profile is available for use by multiple subscribers roaming in said visited packet data based mobile communication network.

20. An apparatus comprising:
receiving means for receiving, from a gateway of a visited packet data based mobile communication network, a request for a subscription profile for a terminal device detected roaming in said visited packet data based mobile communication network and requesting to use said gateway; and
transmitting means for sending, to said gateway, a default subscription profile generated and stored in a network element of said visited packet data based mobile communication network in which said terminal device is roaming, said default subscription profile comprising default subscription data to be utilized in providing services to said roaming terminal device, and said default subscription profile available for use by multiple subscribers roaming in said visited packet data based mobile communication network.

21. An apparatus comprising:
a default subscription profile generator configured to generate at least one default subscription profile comprising default subscription data; and
a default subscription profile storage configured to store said generated at least one default subscription profile in a network element of a visited packet data based mobile communication network, said default subscription data to be utilized in providing services to a terminal device roaming in said visited packet data based mobile communication network, and said at least one default subscription profile available for use by multiple subscribers roaming in said visited packet data based mobile communication network.

22. The apparatus of according to claim 21, wherein said default subscription profile storage is further configured to generate multiple default subscription profiles, each profile comprising at least partially different default subscription data, a default subscription profile out of said multiple default subscription profiles to be selected for a given roaming terminal device according to a predetermined selection criterion.

23. The apparatus of according to claim 21, wherein said default subscription profile storage is further configured to generate default subscription data comprising at least one of allowed access points, allowed services within each allowed access point, charging attributes, Quality of Service attributes, and service chaining attributes.

* * * * *